United States Patent [19]

Shoner

[11] Patent Number: 5,031,679
[45] Date of Patent: Jul. 16, 1991

[54] SYNTACTIC FOAM TIRE INSERTS FOR FLAT-PROOF TIRE AND VEHICLE TIRE INCLUDING SAME

[76] Inventor: Douglas J. Shoner, 12244 Truro Ave., Hawthorne, Calif. 90250

[21] Appl. No.: 423,587

[22] Filed: Oct. 17, 1989

Related U.S. Application Data

[63] Continuation-in-part of Ser. No. 50,445, May 13, 1987, abandoned, which is a continuation-in-part of Ser. No. 822,326, Jan. 27, 1986, abandoned, which is a continuation-in-part of Ser. No. 709,504, Mar. 8, 1985, abandoned.

[51] Int. Cl.$^5$ .......................... B60C 7/00; B60C 7/12; B60C 5/18
[52] U.S. Cl. .................... 152/157; 152/317; 152/336.1; 428/313.3; 428/313.5
[58] Field of Search ............ 152/336.1, 317, 157, 152/334.1, 516, 520, 310–314; 264/503; 428/313.5, 313.3, 357

[56] References Cited

U.S. PATENT DOCUMENTS

| | | | |
|---|---|---|---|
| 852,130 | 4/1907 | Magowan | 152/336.1 |
| 2,838,798 | 6/1958 | Rekettye | 264/503 |
| 3,256,123 | 6/1966 | Hart | 152/336.1 |
| 3,358,062 | 12/1967 | Lemelson | 264/503 |
| 4,110,389 | 8/1978 | Giehler et la. | 264/503 |
| 4,169,494 | 10/1979 | Kubica et al. | 152/333.1 |

FOREIGN PATENT DOCUMENTS 0368582  4/1906  France .............. 152/336.1

OTHER PUBLICATIONS

*Modern Plastics Encyclopedia*, ed, Joan Agranoff: New York, McGraw-Hill, Inc., 1977, vol. 54 No. 10A, pp. 86, 88, 97, 98.

Flinn et al., *Engineering Materials and Their Applications*, 2nd ed.: Boston, Houghton-Mifflin Co., 1981, p. 406.

Primary Examiner—Caleb Weston
Assistant Examiner—Adrienne C. Johnstone

[57] ABSTRACT

This invention is a composite cellular tire insert for insertion into the interior of pneumatic type tires to eliminate flats and blow-outs. The composite cellular tire insert is comprised of a multiplicity of preconstructed, hollow, pressurized, elastomeric, one-piece, seamless cells bonded together into a configuration whereby substantially all of the exterior cell wall surface of all cells in the tire insert, is engaged with portions of exterior cell wall surfaces of surrounding cells thereby providing a cellular tire insert that has substantially no void space or material mass between the cells.

13 Claims, 5 Drawing Sheets

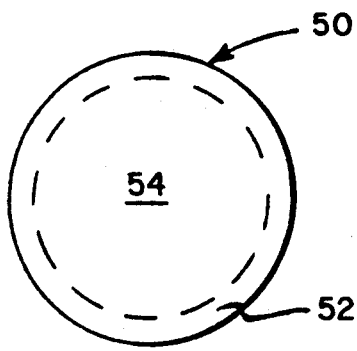
Fig. 3.
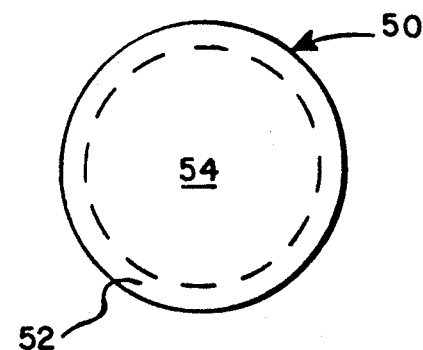
Fig. 4.
Fig. 2.
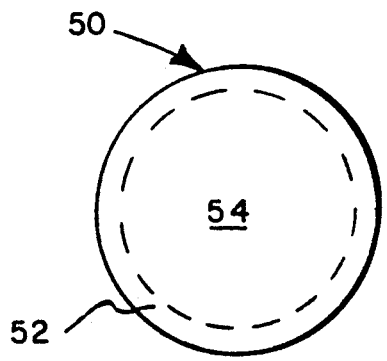
Fig. 5.
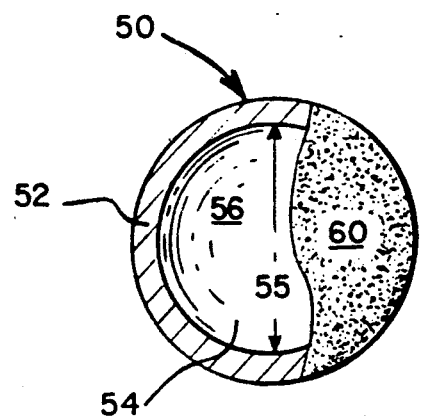
Fig. 6.
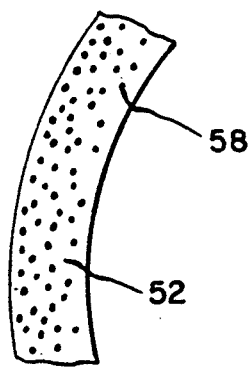

SYNTACTIC FOAM TIRE INSERTS FOR FLAT-PROOF TIRE AND VEHICLE TIRE INCLUDING SAME

This application is a continuation-in-part of continuation-in-part Application Ser. No. 07/050,495, filed May 13, 1987 now abandoned. Continuation-in-part Application Ser. No. 07/050,495, is a continuation-in-part of Application Ser. No. 06/822,326, filed Jan. 27, 1986 now abandoned. Continuation-in-part Application Ser. No. 06/822,326 is a continuation-in-part of Application Ser. No. 709,504, filed Mar. 8, 1985 now abandoned.

BACKGROUND OF THE INVENTION

1. Field of the Invention:

This invention relates to the field of pneumatic type tires for vehicles such as automobiles, trucks, cycles, etc., and is more particularly directed to an improved design for a composite cellular insert to be placed inside pneumatic type tires to provide a pneumatic tire with the ability to sustain punctures without resulting in a detrimental loss of compressed air from within the pneumatic tire.

2. Description of the Prior Art:

The pneumatic tire has existed since 1846 when inventor Robert Thompson received a patent for his "Aerial Wheels". And ever since its invention in 1846 to present date, if pneumatic tires are punctured, they go flat. Therefore, a need has long existed for an apparatus that would eliminate losing the entire volume of compressed air from within a pneumatic tire when its punctured. A great number of apparatuses have been proposed to solve this problem. Efforts as most recently as U.S. Pat. No. 4,416,844 to Wyman, Nov.22, 1983 to as far back as 1892 in U.S. Pat. No. 488,061 granted to Bunker, have tried to solve the problem of pneumatic tires going flat. However, drawbacks have negated all previous "flat-proofing" apparatuses and over-the-road tires today are subject to flats and dangerous high speed blow-outs, just as they were when pneumatic tires were first utilized.

The reason the apparatuses of the prior art have failed to provide a functional means of "flat-proofing" modern over-the-road pneumatic tires is because they do not contain the required volume of pressurized air and they are too heavy. These two key elements are essential for the proper function of pneumatic tires. The larger the volume of air translates into lower required pressure to support the same load. This lower pressure results in a dramatic increase in the tire's ability to absorb bumps and other road irregularities, and not transmit them to the chassis. The weight of a flat-proofing apparatus directly affects unsprung weight. Unsprung weight is any part of an automobile not mounted directly to the chassis. The tires, wheels and any flat-proofing apparatus inside the tire, are all 100% unsprung weight. It has long been known that unsprung weight should be kept to an absolute minimum. These critical elements of high air volume, i.e. low pressure, and low unsprung weight have been known in the art for the past 65 years. Herbert Chase in AUTOMOTIVE INDUSTRIES, Vol. 48, April 12, 1923, p.812-814, discusses the importance and benefits of high air volume and low unsprung weight for pneumatic tires. Fred Duesenberg in THE JOURNAL of the SOCIETY of AUTOMOTIVE ENGINEERS, Vol. XII No. 6, June 1923, p.616-617, also stresses the importance of keeping unsprung weight to an absolute minimum. These references clearly establish 65 years ago, that maximum air volume and absolute minimum unsprung weight have benefits that should be strived for. And which are now essential to the modern automobile. A flat-proofing apparatus must emulate these elements.

Efforts to obtain a flat-proof tire by filling the air chamber of of a pneumatic tire and wheel rim assembly with a closed cell, elastomeric foam produced by a chemical reaction inside the tire, are described in U.S. Pat. No. 3,022,810 to Lambe, Feb. 27, 1962 while the foam density envisioned by Lambe was of the order of 5-10 pounds per cubic foot, it has been established that the actual foam density required to achieve the equivalent pneumatic pressure is 6 times the density postulated. Chemically foamed elastomer tire fillings generated in situ, have the following problems: (1) they increase the unsprung weight to an unacceptable level, (2) continued operation at speeds above 35 MPH causes the foam to generate heat, due to flexing (hysteresis), which at 60 MPH reaches 400 degrees F. causing the foam to revert to a liquid, (3) excessive tire deflection causes the foam to "crumble". These and other problems with chemically foamed elastomer tire fillings for over-the-road use are well known in the tire industry. A paper by J. S. Hawkes, of Goodyear Tire & Rubber Co., titled "FOAM INFLATED TIRES", published in the June 1970 issue of RUBBER AGE Magazine, p. 47-53, documents these problems. These problems appear to be insurmountable in view of the fact that over the past 20 years Goodyear, nor anyone else in the art, has perfected a chemically foamed tire filling free of the aforementioned problems. As evident by the fact that no chemically foamed pneumatic tire filling is commercially available for public highway use, nor Department of Transportation approved for public highway use. This can be attributed to structural and other characteristic of closed cell flexible foams produced directly from a chemical reaction. Namely, cell sizes approximately 0.080 of an inch, cells elongate in the direction of foaming, "ribs" form where cell walls join, reduction in cell wall thickness due to drainage and capillary action, extremely low tensile strengths and difficulty in obtaining a specific cell gas pressure.

Efforts to obtain a flat-proof pneumatic tire also consist of concepts utilizing an array of preconstructed, pressurized, flexible, spherical cells inside a tire and to join the spherical cells into a single mass by using a substantial amount of matrix filler material between the spherical cells. In this way, if some cells were punctured, the remaining cells and matrix filler material would prevent the tire from becoming flat. Examples of this concept are embodied in U.S. Pat. No. 1,449,588 to Connolly, Mar. 27, 1923 and British Patent 11,504 to Wolken, Aug. 9, 1915. While each of these patents generally discloses the concept of spherical cells in a tire, the embodiments disclosed therein utilize two-piece or other such cells comprising a substantial cell wall mass and a substantial amount of matrix filler material, such as rubber, between the multiplicity of spherical cells. This substantially reduces the air volume contained in the pneumatic tire and substantially increasing unsprung weight. These two problems render these concepts unacceptable for use in the pneumatic tires of today's modern automobiles.

In U.S. Pat. No. 4,003,419 to Verdier, Assignee Michelin Tire Co., Jan. 18, 1977, he states the main drawback to devices (to flat-proof) inside the tire cavity is weight. In U.S. Pat. No. 3,866,652 to Ahmad, Assignee B.F. Goodrich Co., Feb. 18, 1975, he also states large increases in tire weight are undesirable. And yet the embodiments of the prior art still produce such heavy structures that they are unapplicable for use in today's modern tires on today's automobiles.

Thus, the prior art has not produced a functional apparatus that embodies a high volume of compressed air while at the same time provide a pneumatic tire with the ability to sustain punctures and not be detrimentally effected by the resulting loss of compressed air and not increase the unsprung weight of the tire and wheel rim assembly to a level that renders it useless for commercial over-the-road applications.

OBJECTS OF THE INVENTION

It is an object of the present invention to provide a functional apparatus for eliminating the sudden deflation of pneumatic tires when punctured while in use on passenger cars operated on public highways.

It is further an object of the present invention to produce a cellular tire insert that fulfills the criteria for proper function of a pneumatic tire, specifically correct air pressure, high air volume and low weight.

Still further, an object of the present invention is to provide several variations of the present invention for specific applications.

It is also an object of the present invention to produce a cellular tire insert that will be free of the problems inherent with pneumatic tires filled with chemically foamed elastomers generated in situ.

It is further an object of the present invention to produce a composite cellular structure that will be free of the problems associated with prior efforts of flat-proofing utilizing preconstructed cells bonded together.

It is also an object of the present invention to provide an apparatus and method for producing cells to be incorporated in the present invention tire insert.

Yet another object of the present invention is to provide a method for constructing an integral cellular composite structure with substantially reduced void spaces and matrix material between the multiplicity of preconstructed cells.

Further objects of the present invention will become apparent in the following detailed description, discussion and the appended claims, taken in conjunction with the drawings.

SUMMARY OF THE INVENTION

The present invention is an integral cellular elastomeric composite structure manufactured in sections to be inserted into the interior of pneumatic type tires and apparatuses for manufacturing the tire inserts.

An apparatus for constructing the one-piece, seamless, pressurized cells of the present invention, rotates a mold about two perpendicular axis simultaneously. This causes the resin inside the pressurized mold cavity to line the entire mold cavity surface. The resin in the pressurized mold cavity is cured while lining the entire mold cavity surface. When the resin has cured, the mold is opened to produce the one-piece, seamless, pressurized cell of the present invention.

The integral cellular elastomeric tire inserts of the present invention are made by first preconstructing elastomeric, one-piece, seamless, hollow pressurized cells in the shape of spheres. The spherical, one-piece, seamless cells are individual structures, with each cell having its own complete, independent, cell wall. A multiplicity of these pressurized spherical cells are then covered with a thin coating of a fluid polyurethane resin and placed in a mold. These coated cells are then transformed from a relation whereby the spherical cells are just touching each other on tangent points, to a configuration whereby substantially all of the exterior surface of all cells is engaged with portions of exterior cell wall surfaces of surrounding cells. The mold is then heated, if required, until the thin coating on the cells has cured, converting the multiplicity of independent cells into a single mass with the cells now permanently remaining in the engaged configuration resulting in substantially no remaining void space or excessive material between the cells. This mass is an independent, integral cellular elastomeric composite structure, liberally referred to as a flexible, pressurized, closed cell, "syntactic" or composite foam.

The Syntactic Foam Tire Insert is placed in a pneumatic tire casing and the tire then mounted to a two-piece, split rim or other suitable device.

Other aspects and advantages of this invention will become apparent from the following detailed description, discussion and the appended claims taken in conjunction with the drawings.

BRIEF DESCRIPTION OF THE DRAWING

FIG. 2 is a frontal view of a spherical cell of the present invention.

FIG. 3 is a side view of the cell shown in FIG. 2.

FIG. 4 is a top view of the cell shown in FIG. 2.

FIG. 5 is a view of the spherical cell of the present invention in partial cross-section and showing the thin fluid coating thereon.

FIG. 6 is a greatly enlarged cross-sectional view of a section of a cell wall of the present invention which is reinforced with flexible fibers.

Figure 1:
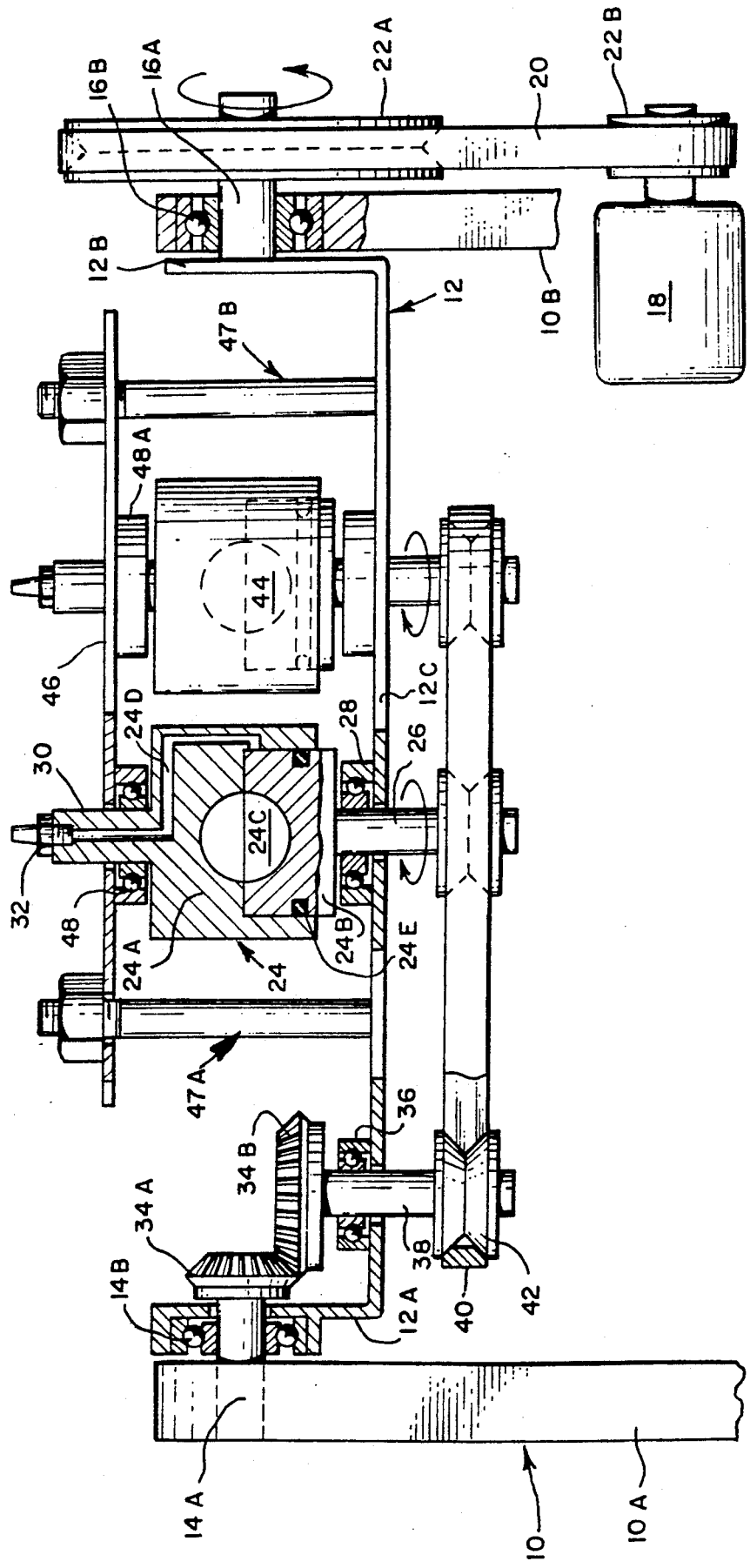
FIG. 1 is a diagrammatic view in partial cross-section of an apparatus for making the spherical cells of the present invention.

| REFERENCE NUMERALS IN DRAWINGS | | | |
|---|---|---|---|
| 10 | Frame | 48 | Cell Mold Bearing |
| 10A | Frame Leg | 48A | Cell Mold Bearing |
| 10B | Frame Leg | 50 | Pressurized Hollow Cell |
| 12 | U-Shaped Bracket | 52 | Cell Wall |
| 12A | Bracket Leg | 54 | Hollow Interior Of Cell |
| 12B | Bracket Leg | 55 | Inside Diameter |
| 12C | Bracket Leg | 56 | Pressurized Gas |
| 14A | Stationary Shaft | 57 | Void Space Between Cells |
| 14B | Bearing | 58 | Flexible Fibers |
| 16A | Rotational shaft | 60 | Fluid Coating |
| 16B | Bearing | 70 | Tire Insert Mold |
| 18 | Motor | 71 | Pin |
| 20 | V-Belt | 72 | End Cap |
| 22A | V-Belt Pulley | 73 | Pin |
| 22B | V-Belt Pulley | 74 | Mold Flange |
| 24 | Cell Mold | 76 | Interior Mold Chamber |
| 24A | Female End Of Cell Mold | 80 | Extension Housing |
| | | 82 | Extension Housing Flange |
| 24B | Male End Of Cell Mold | 84 | Interior Housing Chamber |
| 24C | Cell Mold Cavity | 86 | Follower Plate |
| 24D | Passageway | 88 | Ram-Rod |
| 24E | O-Ring | 120 | Large Cells |
| 26 | Cell Mold Drive Shaft | 130 | Smaller Cells |
| 28 | Cell Mold Bearing | 140 | Additional Tire Insert Mold |
| 30 | Cell Mold Shaft | | |
| 32 | Gas Valve | 160 | Two-Piece "Split" Wheel Rim |
| 34A | Stationary Miter Gear | | |
| 34B | Rotatable Miter Gear | 162 | Pneumatic Type Tire |
| 36 | Miter Gear Bearing | 164 | Syntactic Foam Tire Insert |
| 38 | Rotatable Miter Gear Shaft | 180 | One-Piece Wheel Rim |
| | | 182 | Pneumatic Type Tire |
| 40 | V-Belt | 184 | Tire Sidewall |
| 42 | V-Belt Pulley | 186 | Tire Tread |
| 44 | Additional Cell Mold | 188 | Pneumatic "Inner Tube" |
| 46 | Top Mold Bracket | 190 | Syntactic Foam Tire Insert In "Liner" Configuration |
| 47A | Fastening Bolt | | |
| 47B | Fastening Bolt | 200 | Tangent Point |

DETAILED DESCRIPTION OF THE INVENTION

Method of Constructing the Cells of the Present Invention:

An apparatus for producing the cells of the present invention is invention is shown in FIG. 1. A frame 10 is provided having a first upstanding leg 10a and a second upstanding leg 10b. A rotatable U-shaped bracket 12 is provided between the upstanding frame legs 10a and 10b. The U-shaped bracket has a first leg 12a parallel to and spaced away from the first upstanding frame leg 10a, a second leg 12b parallel to and spaced away from the second upstanding frame leg 10b, and a horizontal leg 12c connecting the first and second bracket legs.

A first shaft 14a passes through leg 10a of the frame and bracket 12a and a second shaft 16a passes through leg 10b of the frame. Shaft 16a is fastened to bracket leg 12b, and shaft 14a is fastened to frame leg 10a and bracket 12 is rotational within frame legs 10a and 10b by bearings 14b and 16b, to permit bracket 12 to be rotatable about the horizontal axis of shafts 14a and 16a.

Power to rotate shaft 16a and bracket 12, is provided by motor 18, in association with a V-belt 20 and V-belt pulleys 22a and 22b.

A cell mold 24 is rotatably attached to the horizontal bracket leg 12c and has a downwardly projecting shaft 26 which passes through mold bearing 28 and through horizontal leg 12c.

Cell mold 24 has a female end 24a, a cylindrical male end 24b, and a mold cavity 24c which forms a sphere when the female end and male end are mated. A passageway 24d is provided in female end 24a of mold 24 for communication with an external source of pressurized gas and within the tolerance between the male and female ends when engaged. An O-ring seal 24e is provided around the circumference of male end 24b to prevent the pressurized gas from escaping out around the circumference thereof when mated with the female end 24a.

The top of female end 24a of mold 24 is provided with a shaft 30 and a gas valve 32, to allow pressurized gas to be injected into mold cavity 24c without the release of gas out of mold 24 when the source of pressurized gas is removed.

Motor 18 is provided to rotate bracket 12 about the horizontal axis of shafts 14a and 16a, and thus rotate cell mold 24 about a horizontal axis. The power to simultaneously rotate cell mold 24 on a vertical/perpendicular axis is in the form of a stationary miter gear 34a mounted onto stationary shaft 14a, and engaged with a rotatable miter gear 34b rotatably mounted on said horizontal bracket leg 12c by bearing 36. The rotatable miter gear 34b has a shaft 38 downwardly extending therefrom for engagement with a V-belt pulley 42 and V-belt 40 which is also connected to mold shaft 26, through a V-belt pulley, to provide a source of energy for rotating mold 24 about its vertical/perpendicular axis.

In operation, cell mold 24 is opened and a predetermined amount of castable resin is placed in the semispherical mold cavity in the male end 24b of the mold. The preferred castable resin is a low viscosity two component polyurethane elastomer system that when these components are mixed together and cured will produce a solid elastomeric material having a tensile strength ranging from approximately 2,000 to 8,000 pounds per square inch (psi.). However other resins found to be acceptable are also within the spirit and scope of the present invention. Castable elastomeric resins that are in liquid or a fine powder form, can be used with the cell casting technique of the present invention, with the liquid resins being preferred. Female mold end 24a is then mated to male end 24b until mold cavity 24c is sealed by O-ring 24e. Pressurized gas is then injected into passageway 24d through gas valve 32, pressurizing mold cavity 24c through a tolerance between mold ends 24a and 24b. When mold cavity 24c is pressurized to the desired pressure, mold ends 24a and 24b are drawn together. Motor 18 is then actuated to rotate shaft 16a by means of V-belt 20 and V-belt pulleys 22a and 22b. The rotational energy on shaft 16a causes bracket 12 to rotate about the horizontal axis of shafts 14a and 16a. When this rotation commences, the rotatable miter gear 34b rotates around the stationary miter gear 34a, causing miter gear shaft 38 to rotate causing V-belt pulley 42 and V-belt 40 to rotate causing mold shaft 26 to rotate causing mold 24 to rotate about the vertical/perpendicular axis of said mold. As a result, cell mold 24 will be rotated simultaneously about perpendicular axes causing the castable resin within mold cavity 24c to be distributed on the entire surface of mold cavity 24c. The rotational speed of shaft 16a, should be a speed as low as possible that will produce a substantially uniform cell wall thickness. Different size cells, different resin viscosities and different amounts of resin used to charge mold cavity 24c, may require the rotational speed of shaft 16a to be adjusted accordingly. The rotational speed of mold shaft 26 and therefore the rotational speed of mold 24 can be increased or decreased independent of the speed of shaft 16a by changing the ratios of miter gears 34a and 34b and or changing the diameter of pulley 42, to allow a desired speed to be achieved. The resin is cured while lining the entire surface of mold cavity 24c. Mold 24 may be heated in any suitable way to effectuate resin curing. When the resin has cured, mold 24 is opened and the cell produced in mold cavity 24c is removed. The cell produced in mold cavity 24c will have a one-piece, seamless cell wall and contain a pressurized gas in its hollow interior.

FIG. 1 illustrates a second cell mold 44 in parallel with mold 24. The second cell mold 44 is identical in construction and operation to cell mold 24. Additional cell molds may be provided along the length of horizontal bracket leg 12c to increase the production of cells. A top mold bracket 46 and bearings 48 and 48a are provided to stabilize the molds and to provide for their pressurization and rotation by being secured to bracket 12 by fastening bolts 47a and 47b.

FIG. 2 is a head-on, frontal view of the one-piece, hollow cell of the present invention showing the cell 50, the cell wall 52 and the hollow interior 54. FIG. 3 is a side view of the same cell shown in FIG. 2. FIG. 4 is a top view of the same cell shown in FIG. 2. These engineering type viewed have been used to clearly show that regardless of how cell 50 of the present invention is viewed, a seam is not present.

FIG. 5 shows a view of cell 50 of the present invention in partial cross-section and showing the thin fluid coating 60 thereon. The cell wall 52 of cell 50 is made of a solid, high tensile strength, elastomeric material such as polyurethane, having a tensile strength ranging from approximately 2,000 to approximately 8,000 pounds per square inch (psi). The thickness of cell wall 52 can range from between approximately 0.001 of an inch to approximately 0.250 of an inch. The hollow interior 54 of cell 50 is filled with a pressurized gas 56 such as nitrogen or air. The exterior surface of cell wall 52 is thinly coated with a fluid resin 60, that when cured, will be a solid elastomeric substance which serves to provide the matrix for the composite cellular tire insert of the present invention. The weight of cell 50 can range from approximately 1 gram to approximately 30 grams. The inside diameter 55 of cell 50 can range from approximately 0.5 of an inch to approximately 2 inches. It is emphasized that these measurements are given for cells anticipated for use in automobile tires. The cell wall thickness, cell weight and cell inside diameter can be smaller or greater, depending upon the size of the tire and the use to which it is put. For example, the dimensions would be smaller for cells used in connection with bicycle tires and larger for earth-moving and mining vehicles.

The strength of cell 50 may be increased by admixing with the resin prior to casting, suitable amounts of reinforcing fibers. FIG. 6 shows a greatly enlarged partial cross-sectional view of cell wall 52 that is reinforced with flexible fibers 58. The flexible reinforcing fibers 58 are mixed into the castable resin that is subsequently placed into mold cavity 24C. This results in the flexible fibers 58 being situated in cell wall 52 and evenly disbursed throughout cell wall 52.

The cells of the present invention are described in terms of seamless, one-piece, hollow, pressurized, elastomeric, spherical cells. While the spherical shape is preferred, the invention is not limited solely thereto, but contemplates the aforementioned cells being of any shape, which may, upon routine testing, be found to be suitable for use with the present invention.

METHOD OF CONSTRUCTING THE TIRE INSERT OF THE PRESENT INVENTION

Figure 7:
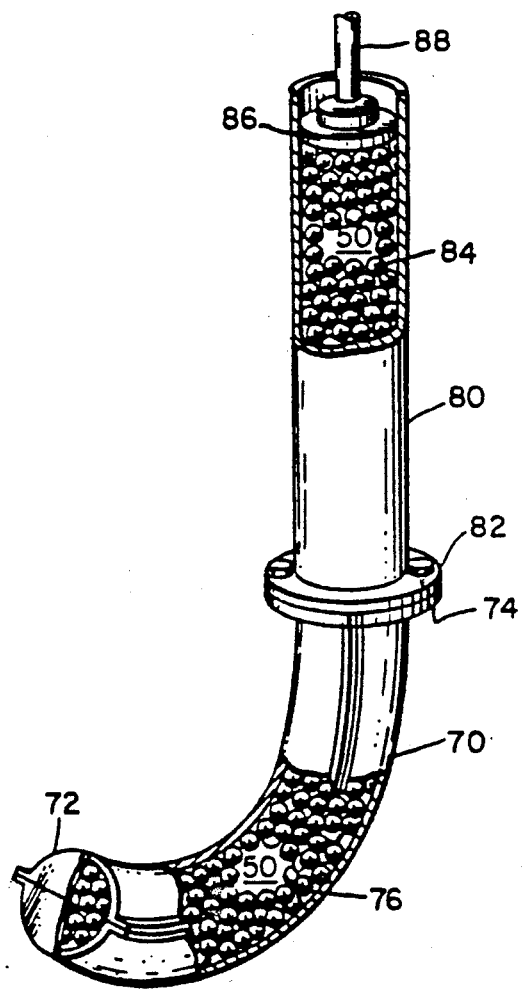
FIG. 7 is a representation in partial cross-section of a tire insert mold and extension housing for making sections of tire inserts of the present invention with both filled with coated cells.
Figure 8:
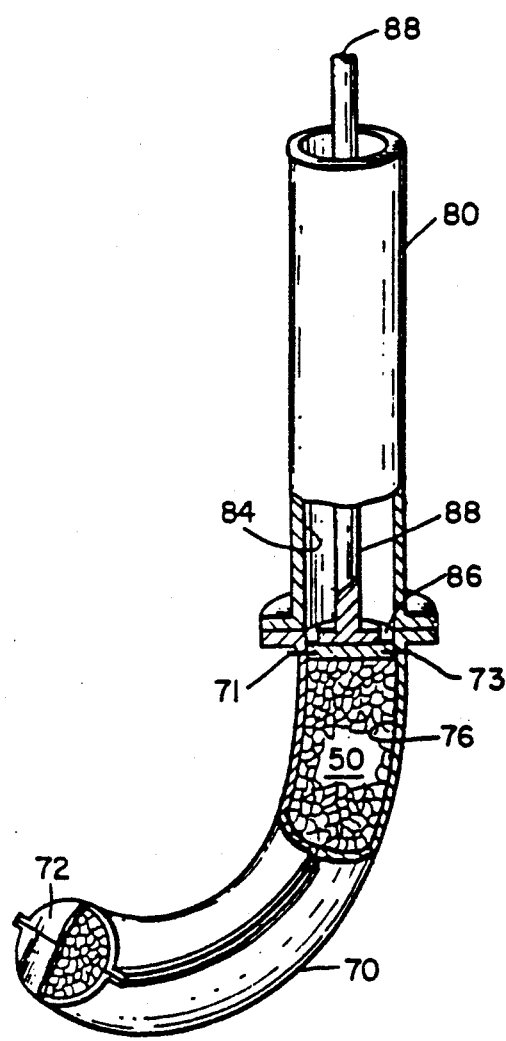
FIG. 8 is a representation in partial cross-section of a tire insert mold and extension housing for making sections of tire inserts of the present invention showing the volume of cells in the extension housing combined with the volume of cells in the tire insert mold.

The preferred embodiment for constructing the tire insert of the present invention is shown in FIGS. 5, 7, 8, 9, 10 and 11. When elastomeric cells 50 are ready to be molded into the tire insert of the present invention, cells 50 are thinly coated with fluid resin 60 which is preferably of the same composition used to manufacture elastomeric cells 50. The preferred cells 50 shown in FIGS. 7 and 8 are the cells of the present invention who's method of construction is set forth above. However, other cells found to be acceptable, can be utilized and are within the spirit and scope of the method to construct the tire insert of the present invention. The preferred coating resin 60 is a polyurethane that will produce a solid elastomer when cured, but other resins that produce solid elastomers when cured are also within the spirit and scope of the present invention. Tire insert mold 70 is formed in the desired shape of the intended tire insert. Tire insert mold 70 shown in FIGS. 7 and 8 is a quarter section of a tire. It will be appreciated that tire insert mold 70 can be in any section, such as a third or half of a tire, depending on the application for which the tire insert is intended. Tire insert mold 70 comprises an integral cap 72 at one end and a mating flange 74 at its other end. Tire insert mold 70 also comprises an interior mold chamber 76. Attached to tire insert mold 70 and in communication therewith, is an extension housing 80. Extension housing 80 comprises a mating flange 82 through which it is attached to mating flange 74 of tire insert mold 70. Extension housing 80 further comprises an internal chamber 84 which is in direct communication with interior tire insert mold chamber 76. When a multiplicity of elastomeric cells 50 are ready to be molded into the tire insert of the present invention, they are coated with a thin layer of fluid resin 60. The cell coating 60 takes place prior to cells 50 being put into tire insert mold 70 and extension housing 80 by any suitable method. One suitable method is to place a multiplicity of cells 50 in a container, pour a predetermined amount of fluid resin onto cells 50 and stir or agitate the cells until coated. Coating cells 50 prior to filling into tire insert mold 70 and extension housing 80 is preferred, but coating 60 may be applied to cells 50 during filling into tire insert mold 70 and extension housing 80 by any suitable method. As shown in FIG. 7 interior mold chamber 76 is completely filled with coated cells 50 and internal chamber 84 of extension housing 80 is also filled with coated cells 50. Thereafter, a follower plate 86, which is symmetrical with the internal profile of interior chamber 84 of extension housing 80, but is of reduced size so as to create a gap for allowing air to vent, is placed on top of cells 50 to close internal chamber 84. As shown in FIG. 8, a ram-rod 88 is used to push on follower plate 86 to move all the cells 50 in internal chamber 84 into interior tire insert mold chamber 76. Due to the spherical shape of cells 50 and fluid resin coating 60 thereon, cells 50 in internal chamber 84 smoothly combine with cells 50 in interior tire insert mold chamber 76. As a result of this combining together, the original shape of cells 50 is transformed causing substantially all of the external surface of cell wall 52 of cells 50 shown in FIG. 8 to be engaged with surrounding portions of external surfaces of cell walls 52 of surrounding cells 50.

Figure 9:
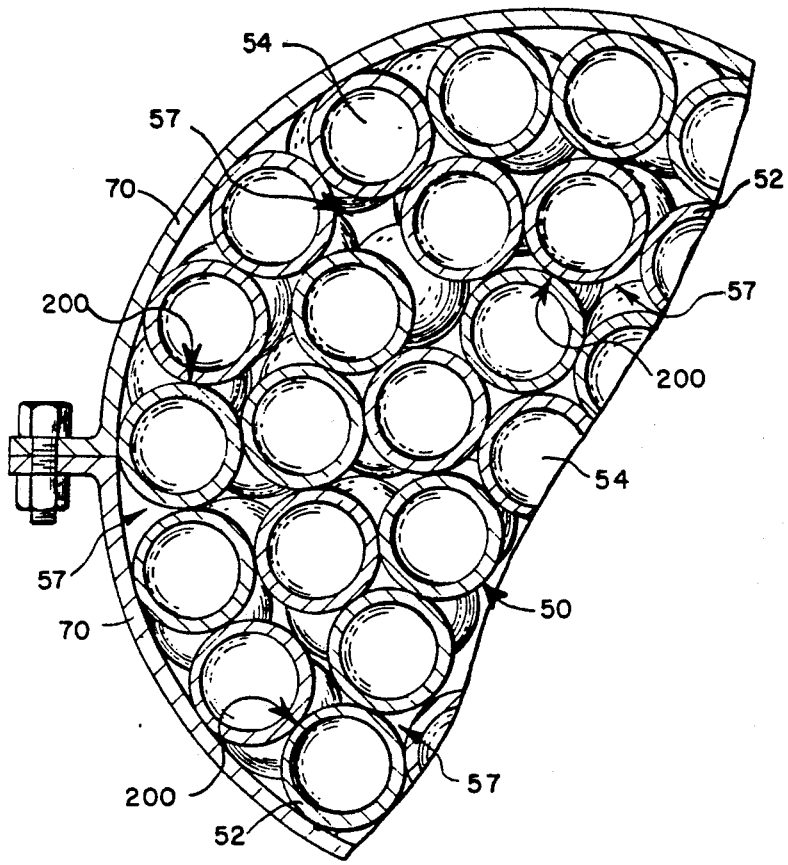
FIG. 9 is an enlarged partial cross-sectional view of FIG. 7 showing the cells in the tire insert mold.
Figure 10:
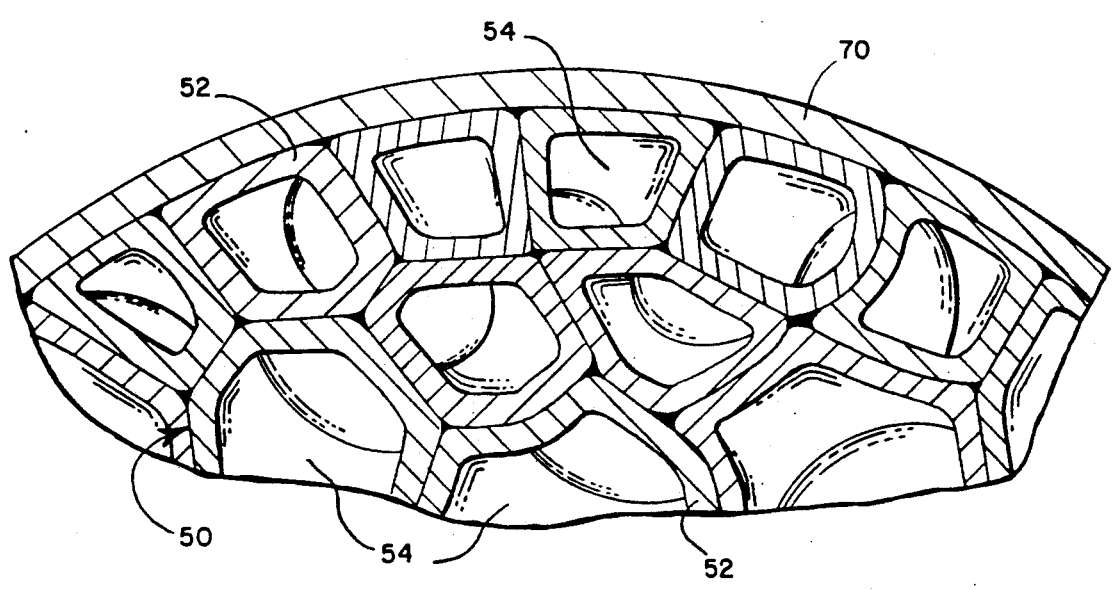
FIG. 10 is an enlarged partial cross-sectional view of FIG. 8 with the cells in their final cellular embodiment.

This engagement of cells 50, is clearly illustrated in FIGS. 9 and 10. FIG. 9 is an enlarged partial cross-sectional view of tire insert mold 70 shown in FIG. 7, showing tire insert mold 70, cells 50, cell walls 52, cells hollow interior 54, void space 57 between cells 50 and tangent points 200. In the uncombined state shown in FIG. 9, cell walls 52 contact adjacent cells walls 52 only at tangent points 200, creating void spaces 57 between cells 50. As shown in FIG. 8, when cells 50 in extension housing 80 are combined with cells 50 in tire insert mold 70, the relation between cells 50 in tire insert mold 70 is transformed, as clearly shown in FIG. 10. FIG. 10 is a greatly enlarged partial cross-sectional view of tire insert mold 70 shown in FIG. 8. FIG. 10 shows that when these two volumes of cells 50 are combined it transforms the relation of spherical cells 50 from just contacting adjacent spherical cells 50 on tangent points 200 in the uncombined state as shown in FIG. 9, to a configuration that comprises substantially all of the total external cell wall surface 52 of all cells 50 in tire insert mold 70 shown in FIG. 8, is in engagement with a portion of the external cell wall surface 52 of adjacent surrounding cells 50. This feature of the present invention shown in FIGS. 8 and 10, produces a tire insert that has: (1) increased air volume, because of the fact that cells 50 are engaged together to fill void space 57 between cells 50, rather than fill void space 57 completely with rubber as the prior art teaches, (2) significantly reduces the weight of the tire insert by eliminating the substantial filler material between cells and (3) increases the number of cells 50 thereby increasing the "flat-proof" capability. These 3 points are the essence of the objective in constructing the tire insert of the present invention.

It shall be appreciated that the volume of cells 50 in extension housing 80 shown in FIG. 7 shall be of sufficient amount so that when combined with cells 50 in tire insert mold 70 shown in FIG. 8, the cell engagement shown in FIG. 10 and described above, will result.

Thereafter, as shown in FIG. 8, follower plate 86 is secured to tire insert mold 70 through pins 71 and 73 to thereby close tire insert mold chamber 76. Then, ram rod 88 and extension housing 80 are removed. The cells 50 in tire insert mold 70 shown in FIG. 8, are then bonded together while in the engaged state shown in FIGS. 8 and 10 by resin coating 60 through heating, if required, tire insert mold 70 in an oven until coating 60 on cells 50 has cured converting the multiplicity of individual cells into a single, integral cellular elastomeric mass. Upon the curing of resin coating 60, tire insert mold 70 is opened to produce the tire insert of the present invention. When removed from tire insert mold 70 cells 50 comprised in the now finished tire insert of the present invention, remain in the engaged state shown in FIG. 10.

Figure 11:
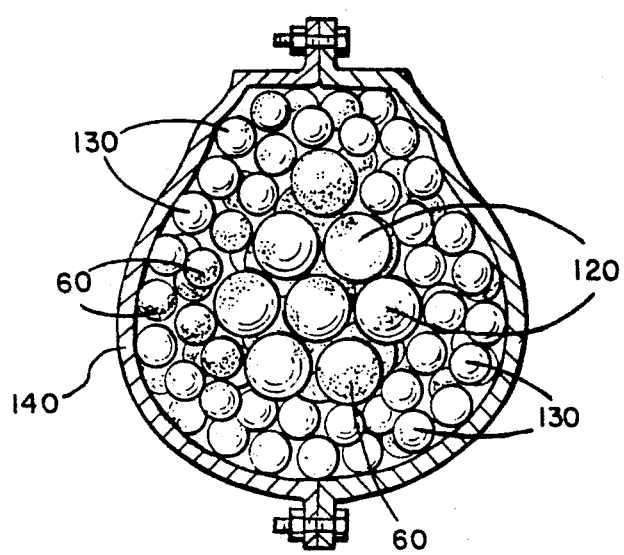
FIG. 11 is a cross-sectional representation of an alternative embodiment of the present invention showing large cells in the center of the tire insert mold and small cells surrounding the large cells.

The weight of the tire insert of the present invention may be tailored for a specific application by using two different cell sizes to manufacture the tire insert. A cross-sectional view of an alternative embodiment of the present invention tire insert is shown in FIG. 11. This view shows cells 120 and 130 in tire insert mold 140 prior to being engaged (comparable to the view shown in FIGS. 7 and 9). This view is shown this way in order to more clearly illustrate the configurations of the different size cells. The larger cells 120 are located toward the center of tire insert mold 140 and smaller cells 130 are located closer to the interior surface of tire insert mold 140. Therefore, when using cells of differing size to manufacture the tire insert of the present invention, cells of smaller size 130 are arranged in tire insert mold 140 so they will be closer to the tire tread and sidewalls than larger size cells 120 when the finished tire insert is installed for use in a pneumatic tire casing. Larger cells 120 will thus be further away from the tire tread and sidewalls and will be closer to the center of the tire than smaller cells 130. By this arrangement, the overall weight of the tire insert of the present invention can be reduced because the volume of larger cells 120 weighs less than the same volume of smaller cells 130. Therefore, the unsprung weight of a tire and wheel rim assembly utilizing the present invention, is reduced by using two different cell size sections, of uniform cell size, to manufacture the tire insert while still maintaining a high degree of "flat-proof" capability.

In an optional step, the exterior surface of the tire insert of the present invention may be coated or impregnated with a gas barrier material such as polyvinyl alcohol, butyl rubber, or polyisobutylene to prevent or reduce gas migration out of the cells. Other gas barrier material suitable for use with the present invention and determined by routine experimentation, may also be used. Polyvinyl alcohol, polybutyl rubber or polyisobutylene are examples of resins used for the gas barrier coating.

THE TIRE INSERT OF THE PRESENT INVENTION

Figure 12:
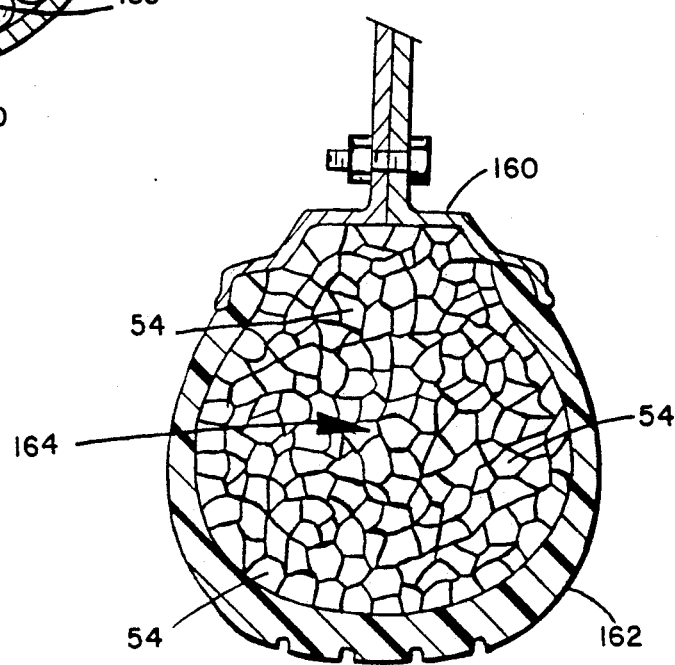
FIG. 12 is a partial cross-sectional representation of an assembly comprising a pneumatic tire and two-piece wheel rim and the tire insert of the present invention.

FIG. 12 shows in partial cross-section, the tire insert of the present invention installed for use in a pneumatic type tire. In FIG. 12 there is shown an assembly comprising the tire insert of the present invention 164 and showing hollow cell interior 54, a pneumatic type tire 162 and two-piece wheel rim 160. The assembly shown in FIG. 12 is obtained by placing the appropriate number of tire insert segments 164, e.g. four one-quarter segments, three one-third segments, etc., into pneumatic tire 162 thereby completely filling the interior of pneumatic type tire 162. Pneumatic type tire 162 filled with the present invention tire inserts 164 is mounted to multi-piece "split" wheel rim 160 whose sections separate along a plane perpendicular to the rotational axis of the wheel. Wheel 160 section's are installed in the open center of tire 162, drawn together, and secured around the circumference of wheel 160 by fastening bolts to form the complete assembly shown in FIG. 12.

When tire insert 164 shown in FIG. 12 is punctured by a nail or other common road hazard, generally only a few cells comprising tire insert 164 will lose their volume of pressurized gas from hollow cell interior 54. But the lose of pressure from within these few cells is insignificant in view of the great number of cells comprising each tire insert. Therefore tire 162 remains operable after being punctured.

Figure 13:
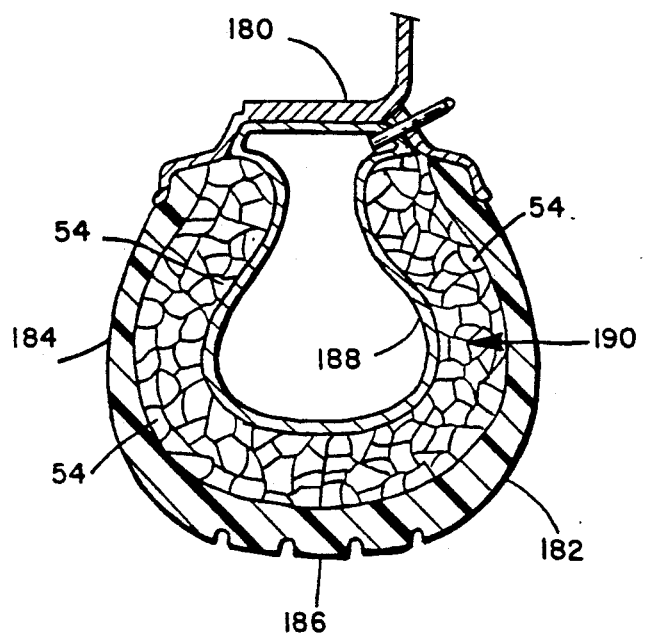
FIG. 13 is an alternative embodiment of the present invention showing a partial cross-sectional representation of an assembly comprising a pneumatic tire and one-piece wheel rim and a pressurized air chamber and the tire insert of the present invention in a liner configuration.

An assembly comprising an alternative embodiment of the present invention is shown in partial cross-section in FIG. 13. This is for applications where punctures generally penetrate into the tire approximately 1 to 3 inches and where eliminating the conventional pneumatic tire air chamber all together is not desirable. In FIG. 13 there is shown an assembly comprising a one-piece, drop center wheel rim 180, a pneumatic type tire 182, tire tread 186, tire sidewall 184, pneumatic inner tube 188 and alternative embodiment tire insert 190 and showing hollow cell interior 54. When using alternative embodiment tire insert 190, tire insert 190 is manufactured in accordance with the method of constructing the tire insert of the present invention as set forth above. Only the shape is different, so as to create a "lining"

between the tire casing's inner surface, adjacent to tire tread 186 and sidewall 184, and inner tube 188. Alternative embodiment tire insert liner 190 will therefore have the cells in the engaged state shown in FIG. 10. As further shown in FIG. 13, tire insert liner 190 is molded to accommodate the internal shape of tire 182. Tire insert liner 190 may also be bonded to the interior surface of tire 182 and to adjacent inserts 190, if a multiplicity are used, by a suitable bonding material to create a hermetic seal and thus an air-tight chamber, to eliminate the need for inner tube 188.

SUMMARY OF ADVANTAGES

The advantages of my composite foam tire insert become apparent over chemically produced foam tire fillings that are generated inside a pneumatic tire. Some of these advantages are: a composite structure defined by preconstructed cells subsequently bonded together. Cell sizes 16 to 80 times larger. Precise control of gas pressure in cells. Cells that do not elongate in the direction of foaming. No "ribs" forming where cell wall join. No reduction in cell wall thickness due to drainage and capillary action. All of the polymer material stays in the cell wall. The preconstructed cells and resulting tire insert are constructed from high tensile strength solid elastomer formulas. A tire insert for insertion into a pneumatic tire casing and in a segmental configuration allowing the removal and replacement of a damaged segment.

The advantages of my composite foam tire insert become apparent over the prior patents on flat-proofing apparatuses utilizing preconstructed cells. Some of these advantages are: because the hollow pressurized cells are constructed in their entirety in one casting operation, the cell wall in one continuous, uninterrupted structure. To further describe this structural characteristic of the cells, the entire external surface and the entire internal surface and the entire interval therebetween, is a single, one-piece structure, completely enclosing a single hollow center, and is *not* composed of pieces, segments or units joined together to form a complete hollow cell. This feature makes possible the construction of a cell of significantly reduced weight, as compared to the cells of the prior art. The cells of the prior art are composed of individual pieces joined together to form a hermetically sealed hollow cell. This requires a substantial wall thickness to successfully accomplish. The cells of my invention do not require an additional manufacturing operation of hermetically sealing segments together to form a sealed, hollow cell. Therefore the wall thickness of the cell can be drastically reduced and as a consequence, the weight of the cell is reduced. The reduced weight of each cell accumulates into a substantial overall weight savings in the resulting tire insert, in view of the large number of cell comprising each tire insert. As a result, this substantially reduces the weight of my tire insert and therefore the unsprung weight of the tire, tire insert and wheel rim assembly. In addition to the weight saving benefit, the one-piece, seamless feature of the cells of my invention eliminates problems of the pressurized gas within the cell from leaking through a seam, and also provides a substantially stronger structure because it does not have a seam line that may rupture. Additionally, another feature of the cells of my invention is that the entire pressurized hollow cell is constructed completely in one casting operation. This eliminates the prior art's subsequent manufacturing operations of hermetically joining and sealing multiple cell pieces into a hollow pressurized cell and makes possible a commercially viable means of mass producing hollow, elastomeric, pressurized cells for composite tire inserts.

Because the cells of my tire insert are in a state that has substantially all of the exterior cell wall surface of all cells engaged with portions of surrounding exterior cell wall surfaces and the cells bonded together in this state, the solid mass of material between the cells of the prior art, is substantially eliminated. This significantly reduces the weight of my tire insert. A mass between cells quickly accumulates into a substantial volume. This volume of solid mass between the cells of the prior art, equals almost half of the total volume of their apparatuses.

The weight of a flat-proofing apparatus is a critical factor. At 60 mph, a passenger car tire generates 160 g's of centrifugal force in the shoulders of the tire. Obviously at these high loads, a heavy apparatus placed inside a tire for flat-proofing will place a tremendous, possibly detrimental, load on the tire structure. My tire insert substantially reduces the load placed on the tire by centrifugal force. This is due to the substantially reduced amounts of material in the cell walls and between the preconstructed cells of my tire insert.

Another undesirable effect caused by weight that is well known is "self-aligning torque". This is a gyroscopic effect caused by the spinning of a heavy tire and wheel rim assembly, i.e. high unsprung weight, which causes the spinning wheel to resist steering inputs from the driver and thereby places additional stress on the steering system by making the automobile harder to steer. This is also a dangerous situation for two reasons. First, in panic situations, the car would be harder to handle. Second, the additional stress can wear out steering system components at an accelerated rate and can cause critical steering system components to fail. My tire inserts address the critical factor of weight of a flat-proofing apparatus inside the tire and thus these safety aspects. In addition to the safety aspect of eliminating high speed blow-outs.

In addition to its obvious flat-proof capabilities, the use of the liner configuration shown in FIG. 13 has the advantage of being able to utilize my tire insert in existing original equipment manufactured (O.E.M.) one-piece drop center rims. Use of my tire insert liner in combination with a conventional inner tube, has the additional advantage of being able to regulate tire pressure. Also to compensate for any pressure loss in the tire insert liner due to gas migration by increasing the pressure in the inner tube.

The principles, preferred embodiments and modes of operation of my invention have been described in the foregoing specification. My invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A cellular tire insert for installation in a tire, said cellular tire insert comprising:
   a. a multiplicity of preconstructed cells comprising enclosed hollow cavities;
   b. prior to being incorporated into said cellular tire insert, each of said preconstructed cells is a complete, individual structure, completely detached from any other of said cells;

c. each of said preconstructed cells comprises an external surface and an internal surface, defining one complete cell wall therebetween of a given thickness, completely enclosing a single hollow center of a given volume;

d. said cell wall is composed of an elastomeric material;

e. said hollow center of said preconstructed cells containing a gas within said hollow center under pressure above that of atmospheric;

f. said multiplicity of preconstructed, individual cells having surface portions of said external cell wall surfaces, engaged with external cell wall surface portions of adjacent cells in a state whereby substantially all of the total external cell wall surface of all cells, is in engagement with surrounding portions of external cell wall surfaces of said surrounding cells;

g. said multiplicity of preconstructed, individual cells are permanently connected together at said engaged external surface portions in said engaged state to collectively provide said cellular tire insert whereby the cells of said cellular tire insert remain in said connected and said engaged state.

2. A cellular tire insert for installation in a tire, said cellular tire insert comprising:

a. a multiplicity of preconstructed cells comprising enclosed hollow cavities;

b. prior to being incorporated into said cellular tire insert, each of said preconstructed cells is a complete, individual structure, completely detached from any other of said cells;

c. said preconstructed, complete, individual, detached cells have a seamless, one-piece cell wall, whereby said cells comprise an independent, one-piece external surface and an independent, one-piece internal surface, defining a complete, one-piece, seamless, independent cell wall therebetween of a given thickness, completely enclosing a single hollow center of a given volume;

d. said cell wall of said preconstructed, seamless cells is composed of an elastomeric material;

e. said hollow center of said preconstructed, seamless cells containing a gas within said hollow center under pressure above that of atmospheric;

f. said multiplicity of preconstructed, seamless cells having surface portions of said external cell wall surfaces, engaged with external cell wall surface portions of adjacent cells in a state whereby substantially all of the total external cell wall surface of all cells, is in engagement with surrounding portions of external cell wall surfaces of said surrounding cells;

g. said multiplicity of preconstructed, seamless cells are permanently connected together at said engaged external surface portions in said engaged state to collectively provide said cellular tire insert whereby the cells of said cellular tire insert remain in said connected and said engaged state.

3. A vehicle tire including the cellular tire insert as defined in claim 2 wherein said cellular tire insert is installed in and fills the interior of said tire.

4. A vehicle tire including the cellular tire insert as defined in claim 1 wherein said cellular tire insert is installed in and fills the interior of said tire.

5. A vehicle tire including the cellular tire insert as defined in claim 2 wherein said cellular tire insert is installed in the interior of said tire and said cellular tire insert is in the form of a lining whereby said lining contacts the interior surface of said tire and a pneumatic inner tube or a pneumatic chamber contacts said lining.

6. A vehicle tire including the cellular tire insert as defined in claim 1 wherein said cellular tire insert is installed in the interior of said tire and said cellular tire insert is in the form of a lining whereby said lining contacts the interior surface of said tire and a pneumatic inner tube or a pneumatic chamber contacts said lining.

7. The invention as defined in claim 2 wherein said elastomeric material from which said cells are composed is comprised of a two-component polyurethane system which when said components are combined and cured, produce an elastomeric solid material having a tensile strength ranging from approximately two thousand (2,000) pounds per square inch (psi), to approximately eight thousand (8,000) pounds per square inch (psi).

8. The invention as defined in claim 1 wherein said elastomeric material from which said cells are composed is comprised of a two-component polyurethane system which when said components are combined and cured, produce an elastomeric solid material having a tensile strength ranging from approximately two thousand (2,000) pounds per square inch (psi), to approximately eight thousand (8,000) pounds per square inch (psi).

9. The invention as defined in claim 2 wherein said cellular tire insert is composed of two different cell size sections, with the section of larger cells located toward the center of said cellular tire insert, and the section of smaller cells located toward the perimeter of said cellular tire insert.

10. The invention as defined in claim 1 wherein said cellular tire insert is composed of two different cell size sections, with the section of larger cells located toward the center of said cellular tire insert, and the section of smaller cells located toward the perimeter of said cellular tire insert.

11. The invention as defined in claim 2 wherein the external surface of said cellular tire insert is coated or impregnated with a gas impermeable barrier to prevent or reduce migration of pressurized gas out of said cells.

12. The invention as defined in claim 1 wherein the external surface of said cellular tire insert is coated or impregnated with a gas impermeable barrier to prevent or reduce migration of pressurized gas out of said cells.

13. The invention as defined in claim 2 wherein said elastomeric material from which said seamless cells are composed is reinforced with flexible fibers.

* * * * *